United States Patent
Sugiyama et al.

(10) Patent No.: US 8,963,457 B2
(45) Date of Patent: Feb. 24, 2015

(54) ELECTRIC STORAGE SYSTEM AND CONTROL METHOD OF ELECTRIC STORAGE SYSTEM

(75) Inventors: Yoshinobu Sugiyama, Toyota (JP); Hidenori Takahashi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/392,372

(22) PCT Filed: Sep. 21, 2011

(86) PCT No.: PCT/JP2011/005318
§ 371 (c)(1),
(2), (4) Date: Feb. 24, 2012

(87) PCT Pub. No.: WO2013/042166
PCT Pub. Date: Mar. 28, 2013

(65) Prior Publication Data
US 2014/0203735 A1   Jul. 24, 2014

(51) Int. Cl.
| H02P 1/00 | (2006.01) |
| H02P 3/00 | (2006.01) |
| B60L 11/18 | (2006.01) |
| H02J 1/00 | (2006.01) |
| H02J 7/00 | (2006.01) |

(52) U.S. Cl.
CPC ............. *B60L 11/1816* (2013.01); *H02J 1/00* (2013.01); *H02J 7/00* (2013.01); *H02J 7/0029* (2013.01); *H02J 7/007* (2013.01)
USPC ........... 318/139; 318/440; 320/107; 320/114; 320/115; 701/22

(58) Field of Classification Search
CPC .............................. H02J 7/0031; H01M 10/44
USPC ................. 318/139, 440; 320/107, 114, 115; 701/22
See application file for complete search history.

(56) References Cited

U.S. PATENT DOCUMENTS

2010/0138087 A1* 6/2010 Takaoka .................. 701/22
2010/0318252 A1* 12/2010 Izumi ....................... 701/22

FOREIGN PATENT DOCUMENTS

| JP | A-2008-99528 | 4/2008 |
| JP | A-2009-50079 | 3/2009 |
| JP | A-2010-259274 | 11/2010 |
| JP | A-2011-160604 | 8/2011 |
| JP | A-2013-85336 | 5/2013 |

OTHER PUBLICATIONS

International Search Report mailed Nov. 22, 2011 issued in International Patent Application No. PCT/JP2011/005318 (with translation).

* cited by examiner

*Primary Examiner* — Bentsu Ro
*Assistant Examiner* — Zemenay Truneh
(74) *Attorney, Agent, or Firm* — Oliff PLC

(57) ABSTRACT

An electric storage system includes a charger which supplies power from an external power source to an electric storage apparatus and supplies power of the electric storage apparatus to an external device. A first and a second system main relay allow connection between a positive electrode terminal and a negative electrode terminal of the electric storage apparatus and a load, respectively. A third system main relay is connected in series with a current limiting resistor and, together with the current limiting resistor, is connected in parallel with the first system main relay. A first and a second charge relay allow connection between the positive electrode terminal and the negative electrode terminal of the electric storage apparatus and the charger, respectively. A third charge relay is connected in series with the abovementioned current limiting resistor and, together with the current limiting resistor, is connected in parallel with the first charge relay.

14 Claims, 3 Drawing Sheets

ELECTRIC STORAGE SYSTEM AND CONTROL METHOD OF ELECTRIC STORAGE SYSTEM

TECHNICAL FIELD

The present invention relates to an electric storage system for supplying power of an external power source to an electric storage apparatus and for supplying power of the electric storage apparatus to an external device, and to a method of controlling the electric storage system.

BACKGROUND ART

In a system described in Patent Document 1, a charger is connected to an electric storage apparatus. The electric storage apparatus is connected to a motor generator through a system main relay and is connected to the charger through a switch relay.

In the system described in Patent Document 1, the power of the electric storage apparatus is supplied to the motor generator to allow driving of a vehicle. Power of an external power source is supplied to the electric storage apparatus through the charger to allow the electric storage apparatus to be charged. In addition, the power of the electric storage apparatus is supplied to an external load through the charger to allow the load to be operated.

PRIOR ART DOCUMENT

Patent Document

[Patent Document 1] Japanese Patent Laid-Open No. 2010-259274

SUMMARY OF THE INVENTION

Problems to be Solved by the Invention

In turning on the system main relay to connect the electric storage apparatus with the motor generator in the system described in Patent Document 1, an electric current needs to be passed through a resistor (referred to as a current limiting resistor) in order to prevent a flow of inrush current. In turning on the switch relay to supply the power of the electric storage apparatus to the charger, an electric current needs to be passed through a current limiting resistor in order to prevent a flow of inrush current. Thus, at least two current limiting resistors need to be provided.

Means for Solving the Problems

An electric storage system according to a first aspect of the present invention includes an electric storage apparatus performing charge and discharge, a load receiving power from the electric storage apparatus to operate, a charger, a system main relay allowing connection between the electric storage apparatus and the load, and a charge relay allowing connection between the electric storage apparatus and the charger. The charger supplies power from an external power source to the electric storage apparatus and supplies the power of the electric storage apparatus to an external device.

The system main relay includes a first system main relay, a second system main relay, and a third system main relay. The first system main relay and the second system main relay allow connection between a negative electrode terminal and a positive electrode terminal of the electric storage apparatus and the load, respectively. The third system main relay is connected in series with a current limiting resistor and, together with the current limiting resistor, is connected in parallel with the first system main relay.

The charge relay includes a first charge relay, a second charge relay, and a third charge relay. The first charge relay and the second charge relay allow connection between the positive electrode terminal and the negative electrode terminal of the electric storage apparatus and the charger, respectively. The third charge relay is connected in series with the current limiting resistor described above and, together with the current limiting resistor, is connected in parallel with the first charge relay.

According to the first aspect of the present invention, only the single current limiting resistor can be used to suppress a flow of inrush current in connecting the electric storage apparatus with the load through the system main relay and to suppress a flow in inrush current in connecting the electric storage apparatus with the charger through the charge relay. Since the single current limiting resistor can achieve the two functions in this manner, the number of parts can be reduced to cut down the cost.

One end of the charge relay can be connected to a connection line between the electric storage apparatus and the system main relay, and the other end of the charge relay can be connected to the charger. Specifically, one end of the first charge relay can be connected to a connection line between the electric storage apparatus and the first system main relay. One end of the second charge relay can be connected to a connection line between the electric storage apparatus and the second system main relay. One end of the third charge relay can be connected to a connection line between the current limiting resistor and the third system main relay. The other ends of the first charge relay, the second charge relay, and the third charge relay are connected to the charger.

With this placement of the first charge relay, the second charge relay, and the third charge relay, the electric storage apparatus and the charger can be connected to each other only by operating the charge relays without operating the system main relays. Since the system main relays are not operated, the deterioration of the system main relays associated with those operations can be suppressed. It is also possible to suppress a power loss resulting from an electric current passing through the system main relays.

The charger can include a capacitor receiving the power from the electric storage apparatus to be precharged. Thus, the current limiting resistor can be used to suppress a flow of inrush current through the capacitor.

The charger can convert an AC power from the external power source into a DC power to output the DC power to the electric storage apparatus. This can charge the electric storage apparatus. In addition, the charger can convert a DC power from the electric storage apparatus into an AC power to output the AC power to the external device. The AC power can be used to operate the external device. Thus, the electric storage apparatus used in the electric storage system can be used as the power source of the external device.

A controller can control operation of the charge relay. In outputting the power of the electric storage apparatus to the charger, the controller can switch the second charge relay and the third charge relay from a disconnected state (that is, OFF) to a connected state (that is, ON) to pass an electric current through the current limiting resistor. The controller can switch the first charge relay from a disconnected state to a connected state and switches the third charge relay from the connected state to the disconnected state after the passage of the electric current through the current limiting resistor. This can complete the connection between the electric storage apparatus and the charger. The controller can pass an electric current through the current limiting resistor until charge of the capacitor through supply of the power of the electric storage apparatus is completed.

The controller can control operation of the system main relay. In outputting the power of the electric storage apparatus to the load, the controller can switch the second system main relay and the third system main relay from a disconnected state to a connected state to pass an electric current through the current limiting resistor. The controller can switch the first system main relay from a disconnected state to a connected state and can switch the third system main relay from the connected state to the disconnected state after the passage of the electric current through the current limiting resistor. This can complete the connection between the electric storage apparatus and the load.

The load can be provided by using a motor generator receiving the power from the electric storage apparatus to produce kinetic energy for use in driving of a vehicle. The electric storage apparatus can be formed by connecting a plurality of electric storage elements in series. The electric storage apparatus can include a plurality of electric storage elements connected in parallel.

According to a second aspect, the present invention provides a control method of controlling operation of the electric storage system described above. In outputting the power of the electric storage apparatus to the load, the second system main relay and the third system main relay are switched from a disconnected state to a connected state to pass an electric current through the current limiting resistor. In outputting the power of the electric storage apparatus to the charger, the second charge relay and the third charge relay are switched from a disconnected state to a connected state to pass an electric current through the current limiting resistor.

According to the second aspect of the present invention, the current can be passed through the single current limiting resistor in outputting the power of the electric storage apparatus to the load and in outputting the power of the electric storage apparatus to the charger. This can suppress an increase in the number of current limiting resistors to cut down the cost.

MODE FOR CARRYING OUT THE INVENTION

An embodiment of the present invention will hereinafter be described.

Embodiment 1

Figure 1:
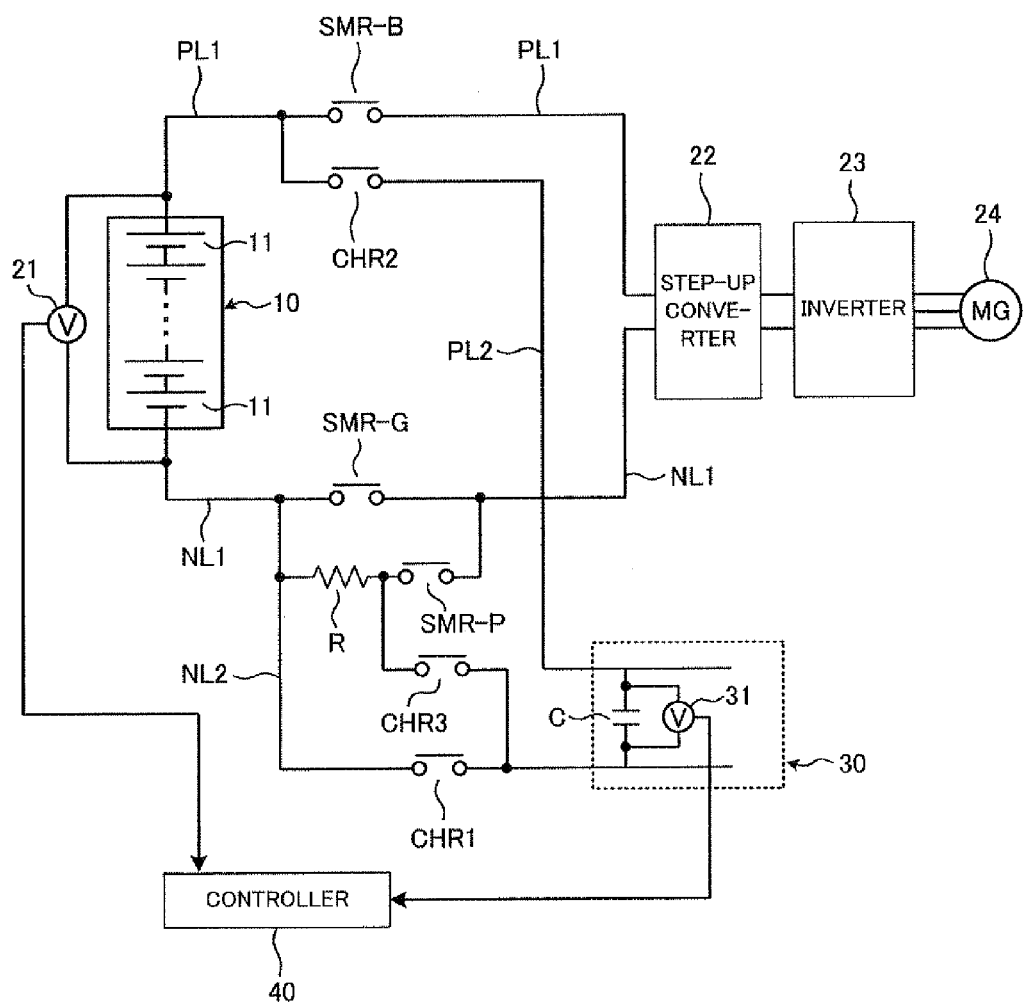
FIG. 1 is a diagram showing the configuration of a battery system.

A battery system which is Embodiment 1 of the present invention is described. FIG. 1 is a diagram showing the configuration of the battery system according to the present embodiment. The battery system of the present embodiment can be mounted on a vehicle. Examples of the vehicle include a hybrid vehicle and an electric vehicle. The hybrid vehicle includes an engine or a fuel cell in addition to an assembled battery, later described, as a power source for driving of the vehicle. The electric vehicle includes only an assembled battery as the power source of the vehicle.

An assembled battery (corresponding to an electric storage apparatus) 10 has a plurality of cells (corresponding to electric storage elements) 11 connected in series. A secondary battery such as a nickel metal hydride battery or a lithium-ion battery can be used as the cell 11. Alternatively, an electric double layer capacitor (capacitor) can be used instead of the secondary battery. The number of the cells 11 constituting the assembled battery 10 can be set as appropriate based on output requirements and the like. The assembled battery 10 may include a plurality of cells 11 connected in parallel.

A voltage sensor 21 detects a voltage between terminals of the assembled battery 10 and outputs the detection result to a controller 40. The assembled battery 10 is connected to a step-up converter 22 through a positive electrode line PL1 and a negative electrode line NL1. The positive electrode line PL1 is provided with a system main relay SMR-B (corresponding to a second system main relay). The negative electrode line NL1 is provided with a system main relay SMR-G (corresponding to a first system main relay).

A system main relay SMR-P (corresponding to a third system main relay) and a current limiting resistor R are connected in series with each other and are connected in parallel with the system main relay SMR-G. The current limiting resistor R is used for preventing a flow of inrush current through a load (for example, a capacitor). Each of the system main relays SMR-B, SMR-G, and SMR-P receives a control signal from the controller 40 to switch between ON (corresponding to a connected state) and OFF (corresponding to a disconnected state).

The step-up converter 22 increases an output voltage of the assembled battery 10 and outputs the increased power to an inverter 23. The step-up converter 22 reduces an output voltage of the inverter 23 and outputs the reduced power to the assembled battery 10. The step-up converter 22 can be formed of a chopper circuit, for example. The step-up converter 22 operates in response to a control signal from the controller 40.

The inverter 23 converts the DC power output from the step-up converter 22 into an AC power and outputs the AC power to a motor generator (MG) 24. For example, a three-phase AC motor can be used as the motor generator 24. The inverter 23 converts an AC power output from the motor generator 24 into a DC power and outputs the DC power to the step-up converter 22.

The motor generator 24 receives the AC power from the inverter 23 to generate a kinetic energy for driving of the vehicle. The motor generator 24 is connected to wheels and thus the kinetic energy generated by the motor generator 24 is transferred to the wheels. For decelerating or stopping the vehicle, the motor generator 24 converts the kinetic energy produced in breaking of the vehicle into electric energy (AC power). The AC power generated by the motor generator 24 is output to the inverter 23. Thus, the regenerative power can be stored in the assembled battery 10.

While the battery system of the present embodiment employs the step-up converter 22, the step-up converter 22 may be omitted, that is, the assembled battery 10 can be connected to the inverter 23.

A charger 30 is connected to the assembled battery 10 through a positive electrode line PL2 and a negative electrode line NL2. The charger 30 converts an AC power from an external power source into a DC power and outputs the DC power to the assembled battery 10. Thus, the power of the external power source can be used to charge the assembled battery 10. The external power source refers to a power source provided externally to the vehicle and independently of the vehicle. For example, a commercial power source can be used as the external power source.

The charger 30 converts a DC power supplied from the assembled battery 10 into an AC power and outputs the AC power to an external device. Thus, the power of the assembled battery 10 can be used to operate the external device. The charger 30 can provide, for example, an AC voltage of 100V to the external device. The external device refers to a device provided externally to the vehicle and independently of the vehicle. Examples of the external device include a household electric appliance.

The negative electrode line NL2 is provided with a charge relay CHR1 (corresponding to a first charge relay). The positive electrode line PL2 is provided with a charge relay CHR2 (corresponding to a second charge relay). One end of the charge relay CHR1 is connected to a connection line (negative electrode line NL1) between a negative electrode terminal of the assembled battery 10 and the system main relay SMR-G. The other end of the charge relay CHR1 is connected to the charger 30. One end of the charge relay CHR2 is connected to a connection line (positive electrode line PTA) between a positive electrode terminal of the assembled battery 10 and the system main relay SMR-B. The other end of the charge relay CHR2 is connected to the charger 30.

One end of a charge relay CHR3 (corresponding to a third charge relay) is connected to a connection line between the current limiting resistor R and the system main relay SMR-P. The other end of the charge relay CHR3 is connected to the charger 30. The charge relay CHR3 and the current limiting resistor R are connected in series with each other and are connected in parallel with the charge relay CHR1. Each of the charge relays CHR1, CHR2, and CHR3 receives a control signal from the controller 40 to switch between ON (corresponding to a connected state) and OFF (corresponding to a disconnected state).

The charger 30 has a capacitor C. The capacitor C is used for smoothing voltage fluctuations between the positive electrode line PL2 and the negative electrode line NL2. A voltage sensor 31 detects a voltage of the capacitor C and outputs the detection result to the controller 40.

Figure 2:
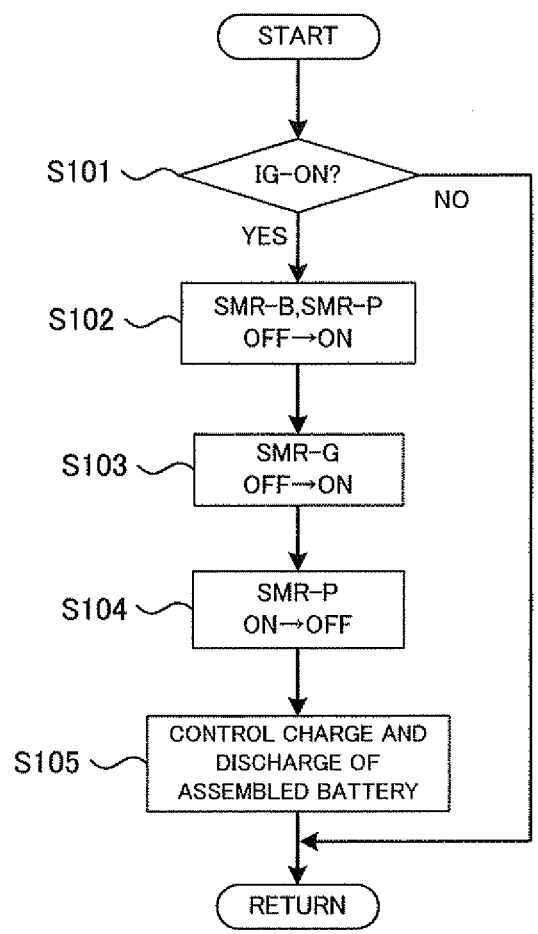
FIG. 2 is a flow chart showing operation in connecting an assembled battery with a step-up converter.

Next, description is made of processing in connecting the assembled battery 10 to the step-up converter 22 with reference to a flow chart shown in FIG. 2. The processing shown in FIG. 2 is performed by the controller 40. At the start of the processing shown in FIG. 2, the system main relays SMR-B, SMR-G, and SMR-P are OFF. The charge relays CHR1, CHR2, and CHR3 are OFF.

At step S101, the controller 40 determines whether or not an ignition switch of the vehicle is turned ON from OFF. Information about ON and OFF of the ignition switch is input to the controller 40. When the ignition switch is turned ON from OFF, the controller 40 proceeds to processing at step S102. When the ignition switch is OFF, the present processing is ended.

At step S102, the controller 40 switches the system main relays SMR-B and SMR-P from OFF to ON. This causes an electric current to pass through the current limiting resistor R to enable prevention of a flow of inrush current through a load (for example, a capacitor, not shown). The capacitor, not shown, can be used to smooth voltage fluctuations between the positive electrode line PL1 and the negative electrode line NL1.

At step S103, the controller 40 switches the system main relay SMR-G from OFF to ON. At step S104, the controller 40 switches the system main relay SMR-P from ON to OFF. Thus, the connection between the assembled battery 10 and the step-up converter 22 is completed.

At step S105, the controller 40 controls charge and discharge of the assembled battery 10. When the controller 40 allows the discharge of the assembled battery 10, the output of the assembled battery 10 can be used to drive the vehicle. When the controller 40 allows the charge of the assembled battery 10, the regenerative power can be stored in the assembled battery 10.

The control of the charge and discharge of the assembled battery 10 is performed on the basis of the voltage of the assembled battery 10 (the voltage detected by the voltage sensor 21), the charge or discharge current passing through the assembled battery 10, the temperature of the assembled battery 10 and the like. For example, the controller 40 can control the charge and discharge of the assembled battery 10 such that the voltage of the assembled battery 10 varies within a preset range from an upper limit voltage to a lower limit voltage.

When the ignition switch is switched from ON to OFF, the connection between the assembled battery 10 and the step-up converter 22 is broken. Specifically, the controller 40 switches the system main relays SMR-B and SMR-G from ON to OFF.

Figure 3:
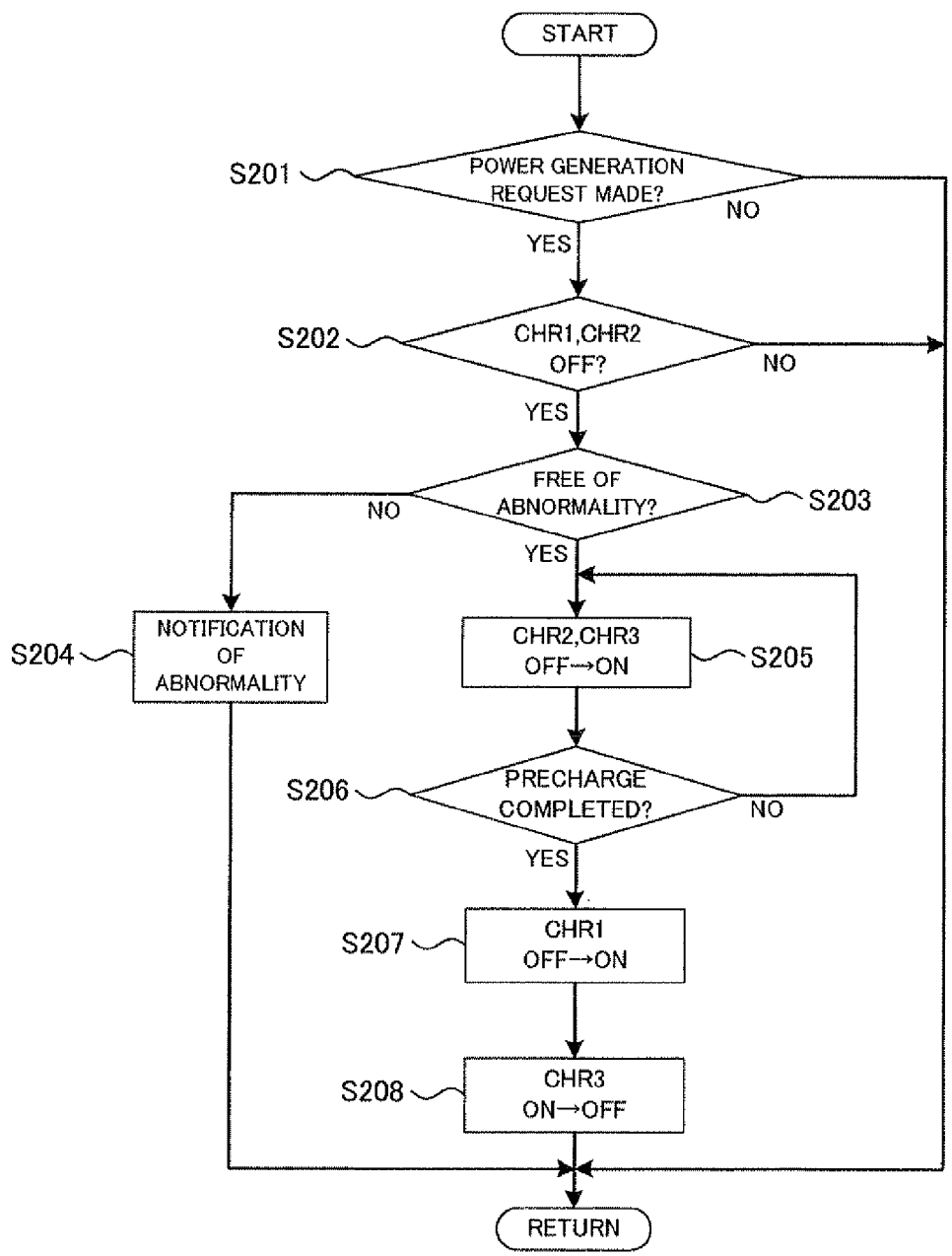
FIG. 3 is a flow chart showing operation in connecting the assembled battery with a charger.

Next, description is made of processing in connecting the assembled battery 10 to the charger 30 with reference to a flow chart shown in FIG. 3. The processing shown in FIG. 3 is performed by the controller 40. The processing shown in FIG. 3 is performed in outputting the power of the assembled battery 10 to the external device. At the start of the processing shown in FIG. 3, the charge relays CHR1, CHR2, and CHR3 are OFF. The system main relays SNR-B, SMR-G, and SMR-P are OFF.

At step S201, the controller 40 determines whether or not a request for power generation is made. Information about the power generation request is input to the controller 40. For example, the power generation request can be made by a switch (not shown) provided for starting the power supply from the assembled battery 10. A user manipulates the switch to input the information about the power generation request (turn-on of the switch in this case) to the controller 40. When the power generation request is made, the controller 40 proceeds to processing at step S202. When the request is not made, the present processing is ended.

At step S202, the controller 40 determines whether or not the charge relays CHR1 and CHR2 are OFF. The controller 40 can determine whether or not the charge relays CHR1 and CHR2 are OFF based on the output of the voltage sensor 31.

When the charge relays CHR1 and CHR2 are ON, an electric current passes from the assembled battery 10 to the capacitor C to charge the capacitor C. Thus, the controller 40 can determine whether or not the charge relays CHR1 and CHR2 are OFF by monitoring the output of the voltage sensor 31. When the charge relays CHR1 and CHR2 are OFF, the controller 40 proceeds to processing at step S203. When they are not OFF, the present processing is ended.

At step S203, the controller 40 determines whether or not an abnormality occurs in the assembled battery 10 and the charger 30. For example, the controller 40 checks the voltage of the assembled battery 10 based on the output of the voltage sensor 21. The controller 40 determines that the assembled battery 10 is abnormal when it is determined on the basis of the voltage of the assembled battery 10 that the assembled battery 10 is overcharged or overdischarged.

The controller 40 checks the voltage of the capacitor C based on the output of the voltage sensor 31. When the voltage of the capacitor C shows an abnormal value, the controller 40 determines that the charger 30 is in an abnormal condition. The processing performed at step S203 is not limited to the abovementioned processing. It is only required to determine whether or not the power of the assembled battery 10 can be supplied normally to the external device through the charger 30. When an abnormality occurs in the assembled battery 10 or the charger 30, the controller 40 proceeds to processing at step S204. When no abnormality occurs, the controller 40 proceeds to processing at step S205.

At step S204, the controller 40 notifies the user or the like of the occurrence of the abnormality. The notification may be of any type recognizable visually or audibly by the user. For example, a speaker can be used to output information indicating the occurrence of the abnormality. In addition, the information indicating the occurrence of the abnormality can be displayed on a display.

At step S205, the controller 40 switches the charge relays CHR2 and CHR3 from OFF to ON. This causes an electric current to pass from the assembled battery 10 to the capacitor C of the charger 30 to precharge the capacitor C. When the current passes through the capacitor C, the current passes through the current limiting resistor R, so that a flow of inrush current can be prevented from passing through the capacitor C.

At step S206, the controller 40 determines whether or not the precharge of the capacitor C is completed on the basis of outputs of the voltage sensors 21 and 31. Specifically, the controller 40 determines that the precharge of the capacitor C is completed when the voltage value of the capacitor C reaches the voltage value of the assembled battery 10. The controller 40 monitors the voltage of the capacitor C based on the output of the voltage sensor 31 and monitors the voltage of the assembled battery 10 based on the output of the voltage sensor 21.

When the precharge of the capacitor C is completed, the controller 40 proceeds to processing at step S207. When the precharge of the capacitor C is not completed, the controller 40 returns to the processing at step S205.

At step S207, the controller 40 switches the charge relay CHR1 from OFF to ON. At step S208, the controller 40 switches the charge relay CHR3 from ON to OFF. Thus, the connection between the assembled battery 10 and the charger 30 is completed, and the power of the assembled battery 10 can be output to the external device through the charger 30.

In supplying the power from the external power source to the assembled battery 10, the controller 40 switches the charge relays CHR1 and CHR2 from OFF to ON. The switch between ON and OFF of the charge relays CHR1, CHR2, and CHR3 can be performed similarly to the processing described in FIG. 3. The charge relays CHR1 and CHR2 are turned on to allow the connection between the assembled battery 10 and the charger 30, so that the power from the external power source can be supplied to the assembled battery 10 through the charger 30.

In the battery system of the present embodiment, the current limiting resistor R is used for preventing a flow of inrush current in connecting the assembled battery 10 with the step-up converter 22. In addition, the current limiting resistor R is used for preventing a flow of inrush current in connecting the assembled battery 10 with the charger 30. Since the single current limiting resistor R can achieve the two functions, the number of parts can be reduced to cut down the cost.

While the one end of the charge relay CHR2 is connected to the connection line (positive electrode line PTA) between the positive electrode terminal of the assembled battery 10 and the system main relay SMR-B in the present embodiment, the present invention is not limited thereto. For example, the one end of the charge relay CHR2 can be connected to the connection line (positive electrode line PL1) between the system main relay SMR-B and the step-up converter 22. In this case, the system main relay SMR-B needs to be turned on in connecting the assembled battery 10 with the charger 30.

While the one end of the charge relay CHR3 is connected to the connection line between the current limiting resistor R and the system main relay SMR-P, the present invention is not limited thereto. For example, the one end of the charge relay CHR3 can be connected to the connection line between the system main relay SMR-P and the step-up converter 22. In this case, the system main relay SMR-P needs to be turned on in connecting the assembled battery 10 with the charger 30.

In the case described above, not only the charge relays CHR1, CHR2, and CHR3 but also the system main relays SMR-B and SMR-P can be operated in connecting the assembled battery 10 with the charger 30. In contrast, when the charge relays CHR1, CHR2, and CHR3 are placed as in the present embodiment, the system main relays SMR-B and SMR-P do not need to be operated.

In the present embodiment, the charge relay CHR2 is connected to the connection line (positive electrode line PL1) between the assembled battery 10 and the system main relay SMR-B, and the charge relay CHR1 is connected to the connection line (negative electrode line NL1) between the assembled battery 10 and the system main relay SMR-G. The charge relay CHR3 is connected to the connection line between the assembled battery 10 and the system main relay SMR-P. With this configuration, the assembled battery 10 and the charger 30 can be connected to each other only by operating the charge relays CHR1, CHR2, and CHR3 without operating the system main relay SMR-B, SMR-G, and SMR-P.

Since the system main relays SMR-B, SMR-G, and SMR-P are not operated in connecting the assembled battery 10 with the charger 30, the deterioration of the system main relays SMR-B, SMR-G, and SMR-P can be suppressed. The system main relays SMR-B, SMR-G, and SMR-P are more deteriorated as the number of switching operations between ON and OFF is increased. The number of switching operations in the system main relays SMR-B, SMR-G, and SMR-P is reduced to achieve the suppression of the deterioration of the system main relays SMR-B, SMR-G, and SMR-P.

If an electric current is passed through the system main relays SMR-B, SMR-G, and SMR-P in connecting the assembled battery 10 with the charger 30, the resistances of the system main relays SNR-B, SMR-G, and SMR-P cause a power loss. However, when the system main relays SMR-B, SMR-G, and SMR-P are not operated in connecting the assembled battery 10 with the charger 30 as in the present embodiment, the power loss can be suppressed.

The invention claimed is:

1. An electric storage system comprising:
   an electric storage apparatus performing charge and discharge;
   a load receiving power from the electric storage apparatus to operate;
   a charger supplying power from an external power source to the electric storage apparatus and supplying the power of the electric storage apparatus to an external device;
   a system main relay allowing connection between the electric storage apparatus and the load; and
   a charge relay allowing connection between the electric storage apparatus and the charger;
   wherein the system main relay includes a first system main relay and a second system main relay allowing connection between a positive electrode terminal and a negative electrode terminal of the electric storage apparatus and the load, respectively, and a third system main relay connected in series with a current limiting resistor and, together with the current limiting resistor, connected in parallel with the first system main relay, and the charge relay includes a first charge relay and a second charge relay allowing connection between the positive electrode terminal and the negative electrode terminal of the electric storage apparatus and the charger, respectively, and a third charge relay connected in series with the current limiting resistor and, together with the current limiting resistor, connected in parallel with the first charge relay.

2. The electric storage system according to claim 1, wherein one end of the charge relay is connected to a connection line between the electric storage apparatus and the system main relay, and the other end of the charge relay is connected to the charger.

3. The electric storage system according to claim 1, wherein one end of the third charge relay is connected to a connection line between the current limiting resistor and the third system main relay, and the other end of the third charge relay is connected to the charger.

4. The electric storage system according to claim 1, wherein the charger includes a capacitor receiving the power from the electric storage apparatus to be precharged.

5. The electric storage system according to claim 1, wherein the charger converts an AC power from the external power source into a DC power to output the DC power to the electric storage apparatus, and converts a DC power from the electric storage apparatus into an AC power to output the AC power to the external device.

6. The electric storage system according to claim 1, further comprising a controller controlling operation of the charge relay, wherein, in outputting the power of the electric storage apparatus to the charger, the controller switches the second charge relay and the third charge relay from a disconnected state to a connected state to pass an electric current through the current limiting resistor.

7. The electric storage system according to claim 6, wherein the controller switches the first charge relay from a disconnected state to a connected state and switches the third charge relay from the connected state to the disconnected state after the passage of the electric current through the current limiting resistor.

8. The electric storage system according to claim 6, wherein the charger includes a capacitor, and the controller passes an electric current through the current limiting resistor until charge of the capacitor through supply of the power of the electric storage apparatus is completed.

9. The electric storage system according to claim 1, further comprising a controller controlling operation of the system main relay, wherein, in outputting the power of the electric storage apparatus to the load, the controller switches the second system main relay and the third system main relay from a disconnected state to a connected state to pass an electric current through the current limiting resistor.

10. The electric storage system according to claim 1, wherein the load is a motor generator receiving the power from the electric storage apparatus to produce kinetic energy for use in driving of a vehicle.

11. The electric storage system according to claim 1, wherein the electric storage apparatus has a plurality of electric storage elements connected in series.

12. A control method of controlling operation of an electric storage system, wherein the electric storage system includes:
an electric storage apparatus performing charge and discharge;
a load receiving power from the electric storage apparatus to operate;
a charger supplying power from an external power source to the electric storage apparatus and supplying power of the electric storage apparatus to an external device;
a system main relay allowing connection between the electric storage apparatus and the load; and
a charge relay allowing connection between the electric storage apparatus and the charger,
the system main relay includes a first system main relay and a second system main relay allowing connection between a positive electrode terminal and a negative electrode terminal of the electric storage apparatus and the load, respectively, and a third system main relay connected in series with a current limiting resistor and, together with the current limiting resistor, connected in parallel with the first system main relay, and
the charge relay includes a first charge relay and a second charge relay allowing connection between the positive electrode terminal and the negative electrode terminal of the electric storage apparatus and the charger, respectively, and a third charge relay connected in series with the current limiting resistor and, together with the current limiting resistor, connected in parallel with the first charge relay, the method comprising:
in outputting the power of the electric storage apparatus to the load, switching the second system main relay and the third system main relay from a disconnected state to a connected state to pass an electric current through the current limiting resistor; and
in outputting the power of the electric storage apparatus to the charger, switching the second charge relay and the third charge relay from a disconnected state to a connected state to pass an electric current through the current limiting resistor.

13. The control method according to claim 12, wherein, in outputting the power of the electric storage apparatus to the charger, the first charge relay is switched from a disconnected state to a connected state and the third charge relay is switched from the connected state to the disconnected state after the passage of the electric current through the current limiting resistor.

14. The control method according to claim 12, wherein the charger includes a capacitor, and in outputting the power of the electric storage apparatus to the charger, an electric current is passed through the current limiting resistor until charge of the capacitor through supply of the power of the electric storage apparatus is completed.

* * * * *